April 1, 1958  M. VANZO ET AL  2,828,797
TIRE BUILDING APPARATUS
Filed March 19, 1954  6 Sheets-Sheet 1

Inventors
Marcello Vanzo
Dario Giletta
Ulisse Nuara
By Watson, Cole, Grindle & Watson
Attorneys

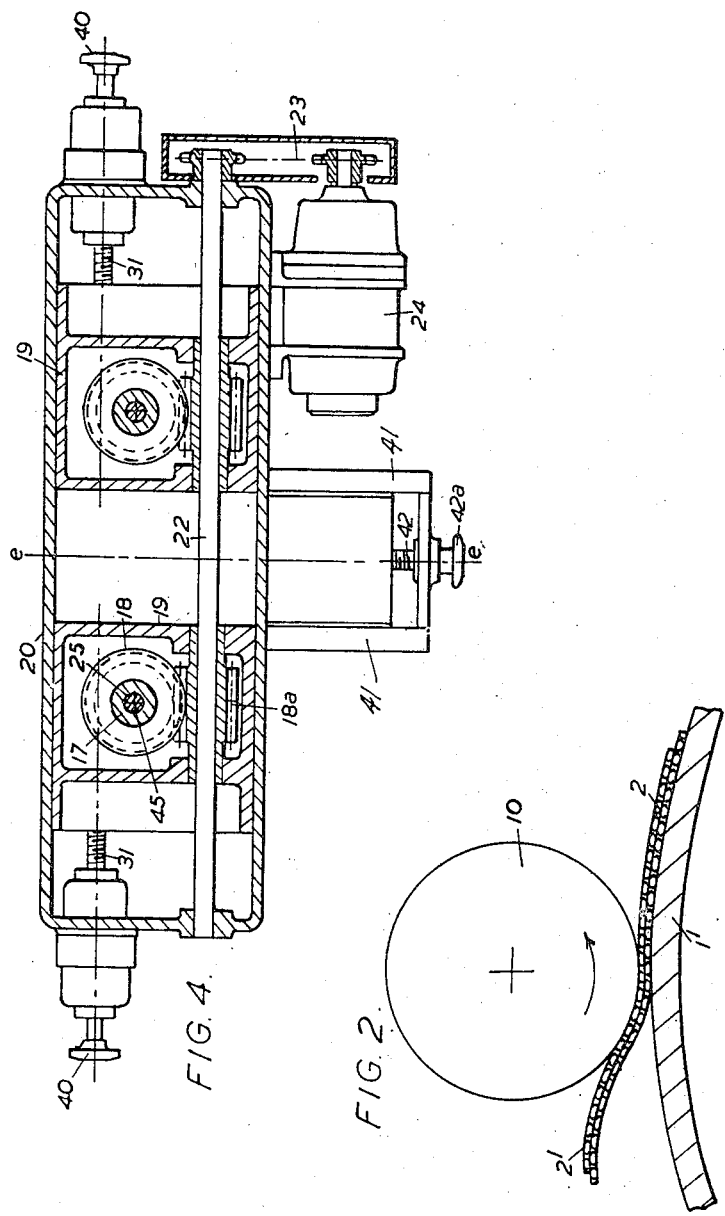

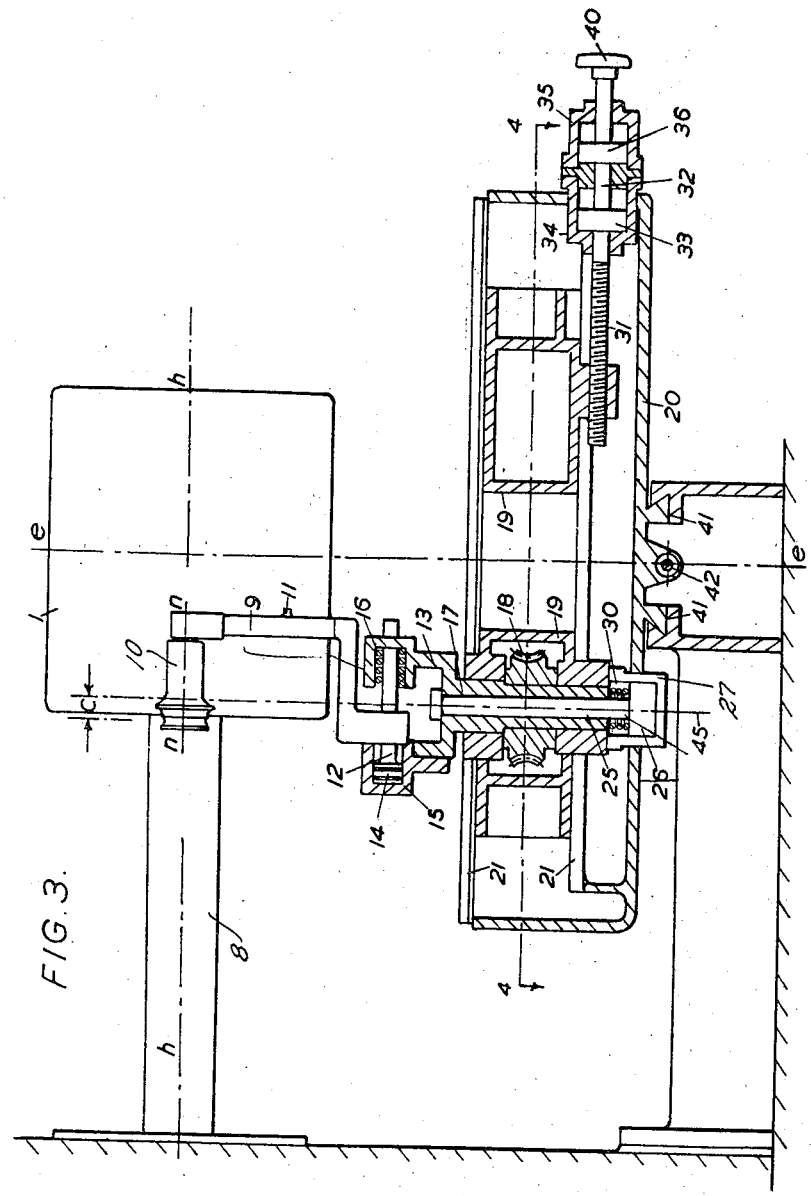

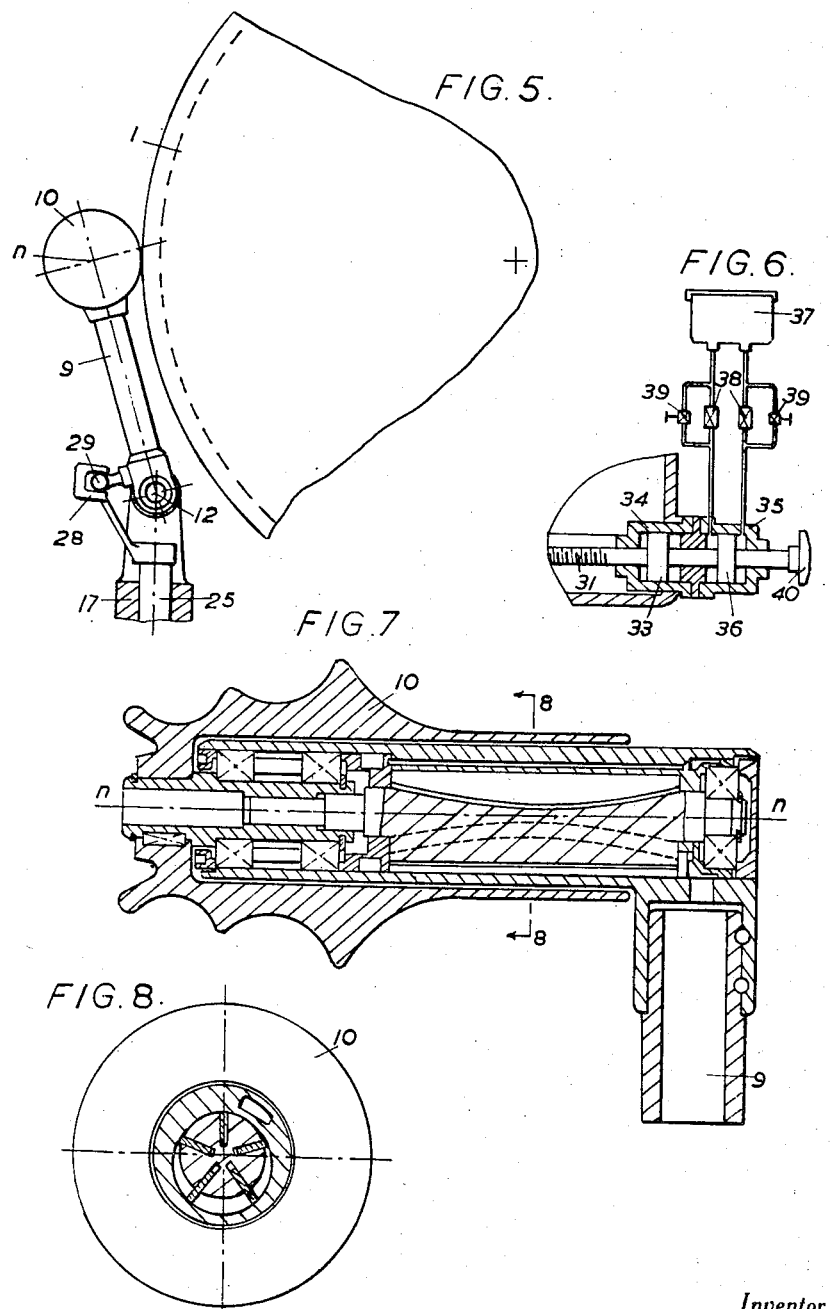

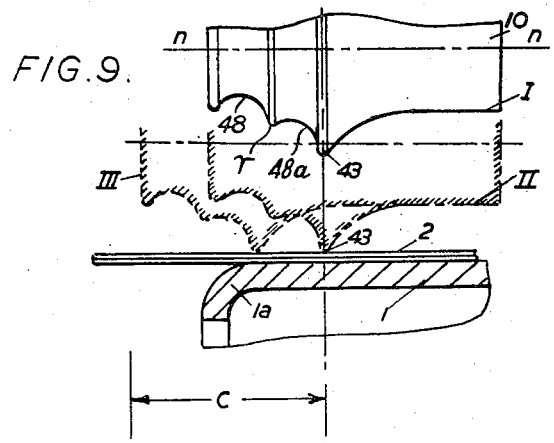
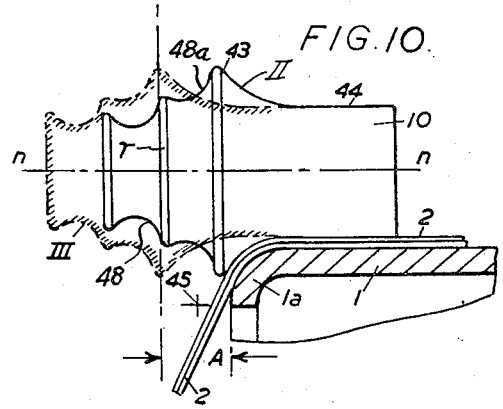
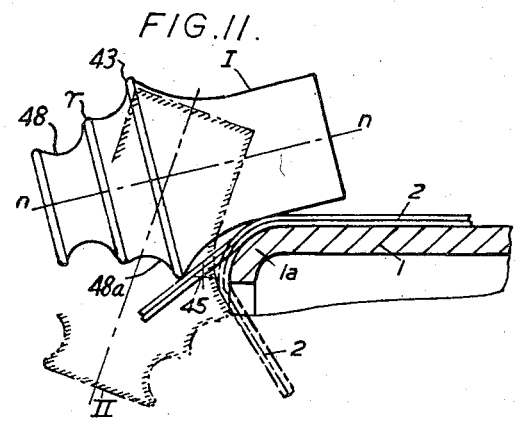

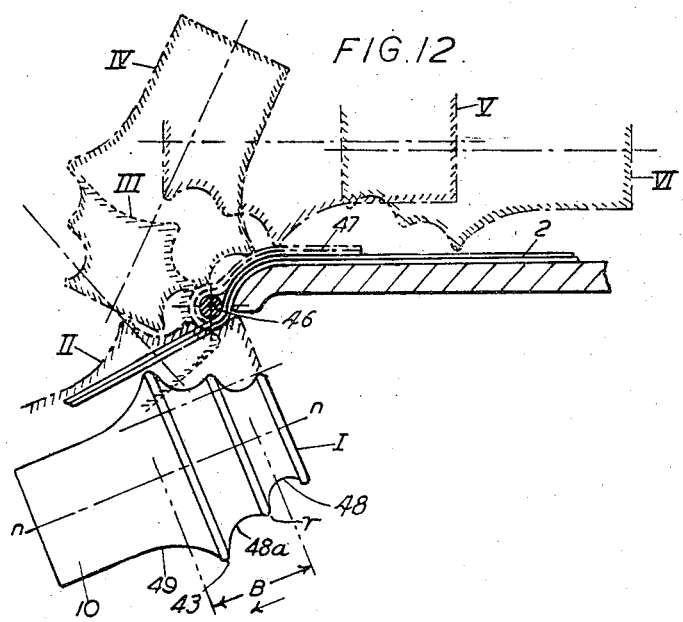
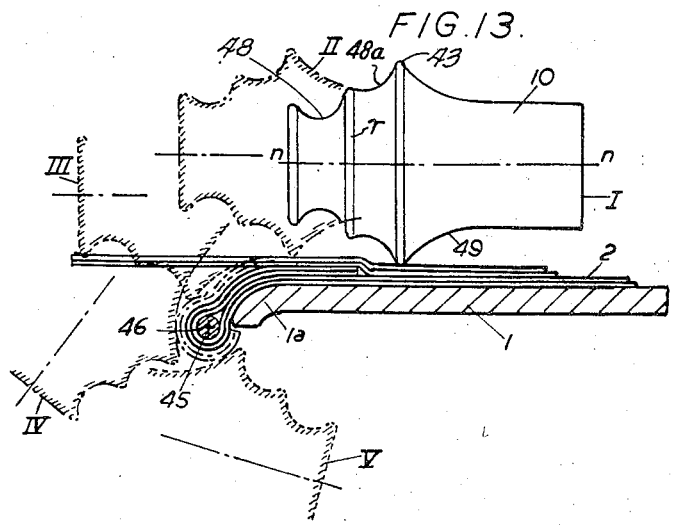

United States Patent Office 2,828,797
Patented Apr. 1, 1958

2,828,797

TIRE BUILDING APPARATUS

Marcello Vanzo, Dario Giletta, and Ulisse Nuara, Milan, Italy, assignors to Pirelli Societa Per Azioni, Milan, Italy, a limited liability company of Italy Application March 19, 1954, Serial No. 417,328

Claims priority, application Italy March 24, 1953

6 Claims. (Cl. 154—9)

This invention relates to methods of and apparatus for building the carcasses of pneumatic tyres for vehicle wheels.

For purposes of definition it may be stated that the invention relates to such methods and apparatus of the type in which (a) a number of rubberised cord fabric plies are applied to the periphery of a rotatable building drum having at each end thereof a rounded shoulder tangential to said periphery, with the cords of the plies transverse to the medial plane of the drum (corresponding to the equatorial plane of the tyre to be produced) and with marginal portions of the plies overhanging the ends of the drum well past the rounded shoulders thereof, the plies being of a width exceeding the axial length of the drum and being applied to the periphery of the drum in one or more operations (hereinafter referred to as "ply-application operations") in which or each of which one or more plies are applied to said periphery; (b) the overhanging portions of the ply or plies, following the ply-application operation or the first ply-application operation, are folded, first, in what will be hereinafter referred to as a "turn-down operation," over the rounded shoulders of the drum to a position in which, in the axial section of the drum and of the plies in position thereon, they extend in the direction toward the rotational axis of the drum, and then, in what will be referred to as a "turn-up operation," first through and around bead cores (usually rubber covered) placed in position concentrically with the drum, and then radially outwardly, in the direction away from said rotational axis, and finally, over the rounded shoulders of the drum, in overlying relation to the ply or plies already in position thereon; (c) the overhanging portions of the ply or plies, following the second and any succeeding ply-application operation (in a case where there are more than one), are similarly folded over the rounded shoulders of the drum and then axially inwardly, and usually also partly around the bead cores, in overlying relation to the out-turned ply or plies; and (d) the plies are pressed during the folding operations firmly into contact with one another, with the bead cores and, in the case of the innermost ply next to the drum, with the drum surface, including those portions thereof which extend over the rounded shoulders of the drum, the plies being so folded in accordance with (b) and so pressed in accordance with (c) by stitching rollers which bear at their peripheries upon the plies against the reaction of the building drum and are caused as the drum rotates with the plies in position upon it and with the rollers bearing upon the plies in the manner stated, to perform a traverse movement relatively to the plies along a path a part of which is rectilinear and extends parallel to the rotational axis of the drum and another part of which is curved and extends around the shoulders at the ends of the drum and partly around the bead cores.

According to one known form of method of the foregoing type the procedure employed is as follows:

Two or more rubberised cord fabric plies having a width greater than the axial length of the drum are first wrapped in superposed layers onto the drum with their marginal portions overhanging the ends of the drum, well past the rounded shoulders thereof and with the cords disposed transversely to the medial plane of the drum.

The overhanging marginal portions of the plies are then folded over the rounded shoulders of the drum in the direction toward the rotational axis thereof, being so folded over and at the same time pressed into intimate contact with the surface of the drum in the manner hereinbefore described by a pair of stitching rollers as referred to in the foregoing definition of the type of method and apparatus with which the present invention is concerned. This is the operation later referred to herein as the "first turn-down operation."

Onto the two folded end portions of the plies in position on the drum are then applied a pair of rubber covered metallic bead cores around which in subsequent operations the beads of the tyre are formed. The bead cores, which are disposed concentrically with the building drum, are placed against the folded over end portions of the plies, the edges of said end portions extending well beyond the bead cores in the direction towards the rotational axis of the drum.

The edges of the folded end portions of the plies so extending beyond the bead cores are then turned axially outwardly, first around the cores and then radially outwardly over the rounded shoulders of the drum to a position in which they lie over the portions of the plies lying on the periphery of the drum, the overlap with respect to these portions extending for a short distance towards the medial plane of the drum from the commencement of the rounded shoulders thereof. This operation, which as in the case of the first in-turning operation is performed with stitching rollers arranged and adapted to operate in the manner above described, said stitching rollers being the same rollers as those that were used in said first inturning operation, is the operation later referred to herein as the "turn-down operation."

Onto this first series of two or more plies in position on the drum is then wrapped a second series of two or more plies of similar fabric to the first, also of greater width than the axial length of the drum and also disposed with their marginal portions overhanging the ends of the drum, past the rounded shoulders thereof and their cords transverse to the medial plane of the drum.

The overhanging marginal portions of the second series of plies are then folded over the out-turned marginal portions of the first series, first over the portions thereof overlying the rounded shoulders of the drum and then towards the rotational axis of the drum, their edges being wrapped about the portion of the first series of plies which is wrapped about the bead cores. This operation, which again is performed with stitching rollers arranged and adapted to operate in the manner above described, said stitching rollers being the same rollers as those that were used in the first in-turning operation, is the operation later referred to herein as the "second turn-down operation."

The carcass so far formed is then completed by wrapping around the plies still in position on the building drum a suitable reinforcing element or elements consisting of rubber and fabric strip material.

Finally, a tread layer is applied over the reinforcing element, or this layer may have the reinforcing elements incorporated with it in a stratum of the layer adjacent the carcass plies.

The actual number of plies which are applied in each ply-application operation, whether preparatory to the first turn-down operation or preparatory to the second turn-down operation, depends upon a number of factors, including the size and type of tyre to be produced. It is generally at least two.

The stitching rollers in methods and apparatus of the type to which the present invention relates have usually had their rolling motion imparted to them by the plies, due to their frictional contact therewith.

With such an arrangement difficulties are frequently experienced, owing to the tendency for the plies, under the drag of the rollers upon them, to form wrinkles which require to be flattened out, with resulting interruption of the building operation to enable this to be done. These difficulties are generally the more pronounced the greater the number of plies being operated upon in a folding operation.

The object of the present invention is to provide an improvement in processes and apparatus of the type described which will avoid these difficulties and ensure regular and continuous production of a tyre carcass.

According to the invention there is provided a method of manufacturing pneumatic vehicle wheel tire carcasses on a building drum, by a process which includes at least one ply turn-down operation performed simultaneously at the two ends of the drum upon overhanging portions of sheet material wrapped upon the periphery of the drum, said operation being performed with the use of a pair of stitching rollers, one at each end of the drum, which stitching rollers during a turn-down operation, are pressed against said sheet material against the reaction of the drum, said method being characterised by the use of power driven stitching rollers, the rollers having their own prime mover means in contrast to being driven by torque transmitted from the building drum, by the stitching rollers having under drive from said prime mover means a free-running peripheral speed which is higher than that of said sheet material and by the driving torque which is imparted to the stitching rollers by said prime mover means being less than the torque which is imparted to the rollers by the friction due to the pressure the rollers exert on the sheet material on the drum.

Further according to the invention, the driving torque imparted to the stitching rollers by the prime movers thereof may be such as to produce a positive thrust of the roller upon the sheet material on the drum in the direction of movement at the point or line of contact of the roller therewith without producing sliding movement of the surfaces in contact, with the result that the peripheral speed of the roller remains equal to that of the sheet material against which it is pressed at the point or line of contact therewith at all positions of the roller relatively to the rotational axis of the drum.

For optimum results it is generally advisable to apply to the stitching rollers a driving torque which remains substantially constant as, for a given rotational speed of the building drum, the rotational speed of the roller varies with the radial position of the roller relatively to the rotational axis of the drum, and also to arrange that the pressure of the roller upon the sheet material against the reaction of the building drum shall be directly proportional to said constant torque.

Further according to the invention, the stitching roller used in carrying the various folding operations of the process into effect may be a roller whose diameter varies at successive points along the axis of the roller and whose disposition relatively to the sheet material at successive positions along the path of travel of the roller during a folding operation is such that during an early part of a turn-down operation a portion of the roller of relatively smaller diameter engages the sheet material against which it is pressed in opposition to the reaction of the building drum, at a peripheral speed which is equal to that of the material at the point or line of contact of the roller therewith, while simultaneously another portion of the roller of relatively greater diameter and therefore greater peripheral speed as compared with the peripheral speed of the sheet material at the point or line of contact of the roller therewith engages a portion of the material which is still in an overhanging position relatively to the end of the building drum, wiping this portion by reason of said greater peripheral speed and thus preparing it for being progressively brought to stitching position as the roller continues in its travel around the shoulder of the drum and eventually the bead core.

A particular embodiment of the invention employing the last mentioned feature thereof is later described herein with reference to the accompanying drawings, and in this embodiment the stitching rollers have a form in which the axial sectional profile of the roller at the periphery thereof is made up of a succession of waves, the crests and similarly the valleys of which come into action successively in a predetermined manner.

It is found that when operating in accordance with the present invention the foregoing difficulties, arising from the tendency of the plies to wrinkle, are completely avoided, and it is readily possible to ensure a regular and continuous operation, devoid of the interruptions which have hitherto been occasioned by the wrinkling of the plies. The causes of the wrinkling and of the elimination thereof when operating in accordance with the present invention are difficult to explain. A possible explanation, however, is given in the following particular description of the invention with reference to the accompanying drawings aforesaid:

In the drawings:

Figures 1 and 1A illustrate two already known stitching devices hereinafter more particularly described;

Figure 2 is a plane development of a conical section through one end of the building drum, the axis of the cone of the section being coincident with the rotational axis of the building drum and the generatrix of the cone of the section passing through the centre of curvature, in the axial section of the drum, of one of the rounded shoulders of the drum, and the view showing also a pair of plies in course of being stitched onto said rounded shoulder and the stitching roller in operation thereon;

Figure 3 is a longitudinal vertical section through a tyre building apparatus in accordance with the present invention;

Figure 4 is a longitudinal horizontal section through the apparatus shown in Figure 3, on the section line 4—4 of that figure;

Figure 5 is a fragmentary section through the apparatus normal to the rotational axis of the building drum and passing through the vertical axis of rotational travel of one of the stitching rollers around the corresponding rounded shoulders of the drum and the corresponding bead core;

Figure 6 represents the hydraulic circuit of the piston which brakes the movement of the roller bearing housing (hereinafter more particularly described) according to the direction of movement thereof along the rotational axis of the drum;

Figures 7 and 8 illustrate the power means (prime movers) employed for driving the stitching rollers of the apparatus, there being such a power means for each roller; Figure 7 is a section along the rotational axis of the roller and Figure 8 is a section normal to said rotational axis.

Figure 1:
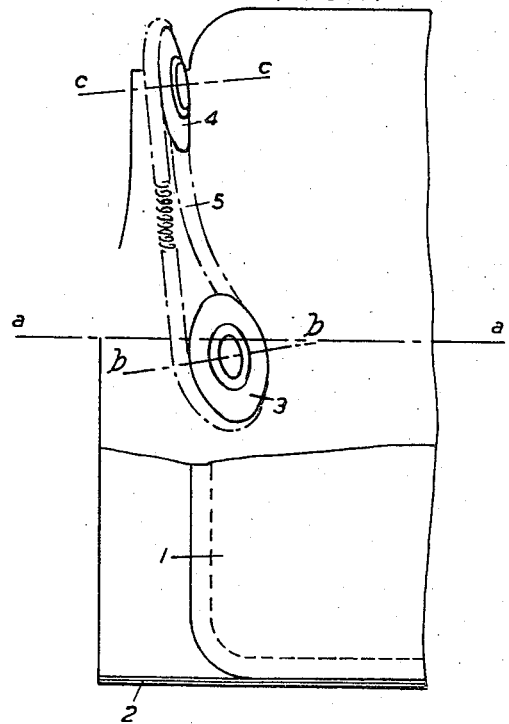

As regards the remaining figures of the drawings, namely Figures 9 to 13, these figures will be described later.

Like reference numerals are applied to like parts in the various figures.

Referring first to Figure 1, this figure shows a building drum rotating about an axis $a$—$a$. 2 are plies wrapped around the drum, partly folded in their upper part. 3 and 4 are two pulleys connected by an elestic means 5, e. g. a spiral spring, and respectively rotating about oblique axes $b$—$b$ and $c$—$c$.

Pulley 3 bears against the cylindrical part of the drum 1 at a position therealong immediately adjacent the commencement of the rounded shoulder of the drum and pulley 4 is positioned at the end of said rounded shoulder.

Pulley 3 is rotated about its axis $b$—$b$ by reason of the friction exerted by the plies 2 on the elastic member 5 and through the intermediary of this same elastic member 5 it actuates the pulley 4, causing it to rotate about axis c—c. The folding operation is started from that section of the elastic member 5 which bears against the drum and is completed by the pulley 4.

Figure 1A:
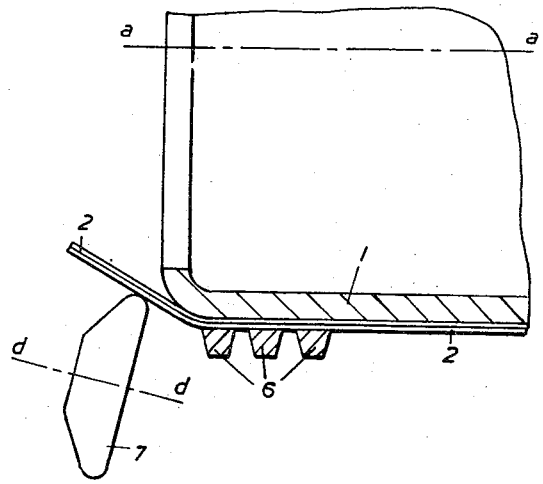

In the device shown in Figure 1A, 1 indicates in axial section a building drum rotating about an axis $a$—$a$; 2 a series of plies wrapped onto the drum and the folding of which has already been started; 6 three V-belts mounted on pulleys (not shown in the figure) which yieldably press the plies against the cylindrical part of the drum at a position adjacent the commencement of the rounded shoulder thereof. Roller 7, which is free to rotate about an axis $d$—$d$ and is rotated by reason of frictional engagement with the plies 2 at the point of contact therewith, moves forward in the direction towards the rotational axis of the drum, skimming the shoulders thereof in so doing, and in this way carries out the folding of the plies 2.

Not taking into account the difficulties that are encountered in a perfect setting of the devices, it will be seen that the above known devices, in folding the plies around the drum shoulders, act only on the overhanging portion of the plies, which in this way is progressively laid on the drum shoulder. The result of this is that the plies can neither be firmly adherent to the drum shoulder nor to one another, and when in the subsequent application of the bead core they are closed together, at the point where the bead core is situated, their folding around the building drum shoulder is loose and inclusions of air may occur. These effects are the more evident, the greater is the number of plies to be simultaneously folded.

Referring now to the method and apparatus of the present invention as illustrated in the remaining Figures 2 to 13 of the drawings, the apparatus is so designed as to be automatic as regards the various ply folding and stitching operations.

It should be remarked before proceeding further that the general working of the machine, including the elements thereof designed to produce the travel of the stitching rollers, will be described first and then the various folding operations later.

The machine illustrated, as regards the means by which the stitching rollers are driven, the stitching rollers themselves and the means by which the stitching rollers are traversed along the axis of the building drum and around the shoulders at the ends thereof, is symmetrical with respect to a medial plane perpendicular to the plane of Figure 3 of the drawings and indicated in said Figure 3 by the straight line $e$—$e$. For a better understanding, therefore, of Figure 3 certain of the details appearing in this figure on one side of said medial plane are omitted on the other side thereof. The movements of the rollers are in every sense symmetrical on the two sides of the machine.

As shown in Figure 3, 1 is the building drum carried by a mandrel 8 and rotating about an axis $h$—$h$. Two arms 9 carry at the upper end thereof the stitching rollers, which are marked 10 and which in each case rotate about a horizontal axis $n$—$n$. The stitching rollers 10 are driven for instance by compressed air motors incorporated in the rollers themselves (see Figures 7 and 8). These motors are of the volumetric type, having sliding radial blades.

The rollers 10 are connected to the rotor of the corresponding compressed air motor, the stator of the motor being fixed to the corresponding arm 9.

The motors of the rollers are fed with operating air under pressure through flexible tubes extending along the interior of the arms 9, which are hollow. These tubes are connected to inlets 11.

It will be understood that the stitching rollers rotate independently of one another, which is an advantageous arrangement in that it leaves the roller free to perform its stitching action on the plies of sheet material on the building drum unhampered in any way or in any circumstance by the other roller.

Further, the arrangement is one in which the stitching rollers and their respective driving motors are free to rotate by reason of frictional contact with the plies on the drum (i. e. when compressed air is not being supplied to the motors) in either direction, according to the requirements of the stitching operation.

In the case of each assembly of roller supporting and traversing elements, the corresponding arm 9 is rigidly connected at the lower end thereof to a pin 12 supported by a fork 13. At the end of pin 12 is a piston 14 working in a cylinder 15 fixed to the fork 13. In reality it will be apparent that each fork 13 forms a trunnion cradle carried by its shaft 17, and the pin 12, supported in such cradle, defines a trunnion axis about which the roller supporting arm is angularly movable.

By applying pressure to cylinder 15 the pin 12, together with the corresponding arm 9 and roller 10, is abruptly displaced for a predetermined distance B, against the opposing thrust of a restoring spring 16 effective to ensure a quick return of the pin 12 and roller 10 upon release of the pressure from cylinder 15.

The forks 13 are integral with shafts 17 to which worm wheels 18 are rigidly connected. Shafts 17 are supported by housings 19 and are freely rotatable about their respective axes.

Housings 19 are mounted on a stationary bench 20 along which they are slidable on tracks 21 incorporated therewith, carrying along with them the corresponding shaft 17 and the parts connected thereto, including the rollers 10.

Worm wheels 18 rotate about their respective axes, being driven in each case by a worm 18$a$ (see Figure 4) supported by corresponding housing 19.

Worm 18$a$ is in turn driven by a shaft 22 supported by the bench 20 and rotated by chain gearing 23 actuated by a motor 24. The coupling between shaft 22 and worm 18$a$ is axially slidable, for which purpose a tooth of the worm wheel engages into a groove extending along a generating line of shaft 22.

In this way, rotation of shaft 22 causes rotation of worm wheel 18 together with the parts to which it is connected, including the corresponding roller 10, about a vertical axis passing through the centre of the worm wheel 18, independently of the position of housing 19 relatively to the bench 20.

Shaft 17 is hollow and extending through it is the stem 25 of a piston 26 slidable in a cylinder 27. By applying pressure to cylinder 27, stem 25 is raised (Figure 5) and with its upper end 28, which is fork-shaped, it pushes button 29 connected to the arm 9 upwardly, causing it to tend to produce rotation of said arm and its pin 12 in a direction to move roller 10 towards drum 1, the thrust upon the roller being exerted through the corresponding arm 9. Therefore, by applying pressure to cylinder 27, roller 10 is pressed against the plies on the drum, and upon release of the pressure a restoring spring 30 (Figure 3) acting on the piston 26 comes into operation to remove the roller from said plies, returning it to its initial position. Since stem 25 passes through the rotational axis of worm wheel 18, its function of approaching the rollers to or removing them from the plies on the drum is independent of rotation of worm wheel 18.

Displacement of housing 19 with respect to bench 20, required to move the roller lengthwise on the drum along path C (Figures 9 and 10), such displacement being indispensable during the "first turn-down operation" as hereinbefore referred to, is obtained by coupling the housing 19 to the bench by a screw 31 which is virtually an extension of the stem 32 of a piston 33 working within a cylinder 34 carried on the bench 20 in fixed relation thereto.

By admitting air under pressure to cylinder 34, either at one side of the piston 33 or at the other, said piston and housing 19 are displaced lengthwise of the building drum.

Displacement of the housing 19 must be slow enough to allow roller 10 to run on the drum along a spiral path whose pitch is relatively small. To ensure this, displacement of piston 33 is braked and adjusted by a second piston 36 working within a second cylinder 35 in series with cylinder 34. Piston 33 cannot move along the cylinder 34 without dragging piston 36 along cylinder 35. The two ends respectively of cylinder 35 (see Figure 6) are connected to an oil tank 37 through the intermediary of a pair of check valves 38, 38 across which respectively a pair of cocks 39 are shunted. When piston 33, under the action of the pressure applied to cylinder 34, tends to displace housing 19 with respect to the bench 20, the oil contained in cylinder 35 is forced to flow through one or other of the cocks 39, or both (according to the setting of the cocks).

By suitably adjusting the cocks 39, therefore, the displacement speed of the housing 19 is regulatable at will.

When the building drum is to be replaced, it is necessary that rollers 10 be set in the correct working position to enable this to be done, by suitably displacing the housing 19, as may be necessary, in the longitudinal (parallel to the axis of the building drum) and/or transverse (towards and away from said axis) directions.

Displacement in the longitudinal direction is obtained separately for each housing 19 by turning a handle 40 on the corresponding screw 31. Pistons 33 and 36, which are rigidly connected to the screw 31, turn solidly therewith.

Displacement in the transverse direction is obtained by moving the whole bench 20 on tracks 41 along which it is slidable bodily. This is performed by turning a screw 42 by means of a handle 42a.

The complete cycle of the operations carried out by the stitching rollers will now be described, as follows:

The operations, visualising for instance the building of a tyre of the type used on motor cars, are:

(1) A "first turn down operation."
(2) A "turn-up operation."
(3) A "second turn down operation" all as hereinbefore referred to.

In what follows the stitching method, comprising these three operations, will be described with reference to one side only of the drum; it being understood that the method will be the same, in a symmetrical sense, at the other side of the drum.

Figures 9, 10 and 11 illustrate the "first turn down operation." They show a section of the building drum at one end thereof in a plane containing both the rotational axis of the drum and the rotational axis of the stitching roller. As in the earlier Figures 2 to 8, the building drum, which is marked 1, the rounded shoulder of the drum being marked 1a, is shown with the assembly of plies 2 to be folded around the drum shoulder in position. 10 is the power driven stitching roller and n—n is the rotational axis of this roller.

Prior to the commencement of the "first turn-down operation," the various moving parts of the machine being stationary, the position of said moving parts, which are the parts indicated in Figures 3, 4, 5 and 6, is as follows:

Roller 10 is in its retracted position, removed from the plies on the drum, because pressure has not yet been applied to cylinder 27 (position I, Figure 9); pressure has not yet been applied to cylinder 15; piston 33 is in such a position that the housing 19 is displaced towards the centre line e—e of the building machine; and drum 1 and roller 10 are at rest.

By applying pressure to cylinder 27, the arm 9 and therefore the roller 10 are caused to approach towards the outer surface of the drum until the edge 43 of the roller (position II, Figure 9) comes into contact with the ply assembly 2.

As soon as the edge 43 has attained contact with the ply assembly 2, the following operations are simultaneously performed:

A. The building drum 1 is set in rotation about its axis h—h.

B. Pressure is applied to the compressed air motor which drives the roller 10 about its rotational axis n—n.

C. Pressure is applied to cylinder 34 which results in displacement of the housing 19 in the direction towards the end of the drum, said displacement being in a direction parallel to the rotational axis of the drum.

Roller 10, now in pressure contact with the plies on the drum, cannot turn at a peripheral speed higher than that of the outermost of these plies at the point of contact of the roller therewith, because the friction exerted on the roller by the ply assembly prevents it from doing so. Consequently the roller begins to rotate at a peripheral speed, at its edge 43, equal to that of the outermost ply at the point of contact of said edge therewith, at the same time exerting on the ply assembly a tangential thrust in the direction of movement of the assembly at said point of contact.

The roller 10 moves forward to the outer end of drum 1 (position III in Figure 9) and its edge then travels beyond the cylindrical part of the drum and, after having run along a first part of the rounded shoulder 1a, moves to a position beyond the end of the drum, indicated at II in Figure 10, in which position, under the pressure which pushes the roller in the direction towards the drum, the cylindrical part 44 of the roller is in line contact with the plies on the building drum. The rotational speed of the roller is therefore changed, the peripheral speed of the cylindrical part 44 becoming equal to the peripheral speed of the ply assembly at the line of contact of the roller therewith. Since the diameter of the cylindrical part 44 is smaller than that of the edge 43, the peripheral speed of edge 43 is higher than that of the ply assembly at the point of contact of edge 43 therewith. Said higher speed of edge 43 with respect to the ply assembly, as will be explained later, is a necessary condition in order to avoid at this moment the formation of wrinkles.

Roller 10 moves on in a direction parallel to the rotational axis of the drum 1 and stops, at position III in Figure 10, when its edge 43 reaches the distance A from the limit of the drum shoulder. Said distance A is nearly equal to the width of the space occupied by the bead core when wrapped by the plies. The total horizontal displacement of the roller corresponds to length C (Figure 3). When said position is reached, the roller stops and shaft 22, driving the worm 18a contained in housing 19, is put into rotation. It follows that shaft 17, arm 9 and therefore roller 10 are caused to rotate about the shoulder of the building drum in a horizontal plane as illustrated in Figure 11 (position I). The centre of rotation 45 corresponds to the centre of the bead core section when this is in position (it is not yet in position). When a rotation angle sufficient to fold the plies around the drum shoulder 1a to such a position (position II, in Figure 11) as to enable the bead core to be placed easily into position against the in-folded ply assembly, has been reached, the rotational movement stops and, by releasing the pressure from cylinder 27, the roller is removed from the plies on the building drum.

The first folding operation is now completed and the plies around the drum shoulders are perfectly compact and do not show wrinkles. This is due to the action of the power driven stitching roller 10. Thus with the use of such a roller the formation of wrinkles is avoided for the reason that, when the roller is in contact with the plies on the drum, it is compelled, due to the frictional contact with the plies, to assume the same peripheral speed as the plies (i. e. at the point or line of contact therewith), but if the torque transmitted to it by its motor has a value such that the resulting thrust upon the plies at the point or line of contact of the roller therewith is sufficient to overcome the drag upon the plies due to the pressure of the roller upon them and in addition to exert a thrust upon the plies the effect will be as if the roller were tending continually to make the plies slide under it in the direction of rotation, thereby avoiding the formation of upstream waves, which at the next passage of the roller would become wrinkles.

Figure 2 illustrates the action. Thus, referring to this figure, when the plies 2' not yet stitched come gradually into contact with the roller, their cords receive a pressure from the roller which tends to compress them in the direction to bring them nearer together in the fabric, so that when they come in contact with the zone 1' of the surface of the building drum, they are stitched onto it in closer juxtaposition to one another than their initial (pre-stitched) spacing; the result is that the development of the plies conforms to that, progressively decreasing, of the drum shoulder. The thrust thus exerted by the stitching roller on the cords of the plies overcomes, of course, the plastic reactions of the rubber of the fabric consequent on the compression thereof incident in the bringing of the cords closer together.

Experimental tests have shown that a necessary relation exists between the torque applied to the roller and the pressure exerted by the roller itself on the plies, over which no formation of wrinkles takes place.

It is also important to bear in mind that when the roller is at position II (Figure 10) its cylindrical part 44 has the same peripheral speed as the plies, while the edge 43, being of greater diameter, has a considerably higher peripheral speed. Such higher peripheral speed of the edge 43 in comparison with that of the plies causes a sliding movement of the edge relatively to the plies, or in other words a wiping action relatively thereto, which tends to stretch the plies in the rotational direction, flattening them before they actually pass into stitching position under the roller.

Further, as the spiral path traversed by the roller on the plies on the revolving drum is of very small pitch a perfect stitching of the plies in correspondence with the ends of the drum is obtained, with resulting elimination of any inclusion of air.

As later more particularly described, the roller is provided with further grooves to the left (in the figures) of the edge 43. These ensure a perfect performance of the remainder of the folding and stitching operations of the roller. During these further stages in the action of the roller the latter need not be driven by its motor; it may rotate freely under the action of the friction exerted on it by the plies. On the other hand even during said further stages the roller may if necessary in order to ensure a perfect result, be driven by its motor.

Figures 12 and 13 illustrate the futher stages aforesaid of the action of the roller, it being understood that the operations described with reference to these figures are simultaneously accomplished at the opposite end of the building drum.

Figure 12 indicates diagrammatically the "turn-up operation" as hereinbefore referred to. The ply assembly 2 has been brought to its turned down position, the bead core 46 is in place and the edge 47 of the ply assembly are not yet on the portion of the assembly wrapped onto the peripheral surface of the drum. Through rotation of worm wheel 18 driven by shaft 22, the roller 10, detached from the plies (pressure is not applied to cylinder 27), is disposed inside the drum shoulder (position I, Figure 12). Said rotation occurs about 45, which is at the centre of the section of the bead core 46. Immediately before or even during said rotation, pressure is applied to cylinder 15. Roller 10 is thereby caused to effect a quick translation movement along its axis for distance B, the groove 48, instead of groove 49, being brought in such a positon as to encircle the bead core when, upon applying pressure to cylinder 27, the roller is pressed against the plies (position II, Figure 12). At this moment, through worm wheel 18, the rotation of roller 10, in the plane of the drawing, is started about centre 45 in the outward direction.

Having completed the rotation (through positions III and IV, Figure 12) when the axis of roller 10 is parallel to that of drum 1 or substantially so (position V, Figure 12), pressure is applied in the proper direction to cylinder 34, with the result that the roller is translated parallel to the axis of the drum to position VI of Figure 12, the edges 47 of the plies being thus perfectly stitched in their turned-up position.

When the horizontal translation has been completed, i. e. the run of piston 33 has been stopped, the pressure is released from cylinders 27 and 15 and the roller is detached from the plies and brought back to the initial position at the commencement of the folding operation.

At this moment the second series of plies is wrapped onto the drum and the "second turn-down operation" as hereinbefore referred to is accomplished.

Figure 13 illustrates this operation.

Before describing the second "turn-down operation," however, it may be remarked that the stitching rollers of the machine have, as already remarked, a form in which the axial sectional profile of the roller at the periphery thereof is made up of a succession of waves two of the crests of which, formed respectively by the top of the annular rib $r$ and the edge 43 (said edge forming in effect a second annular rib similar to the rib $r$) and laterally bounding the annular groove 48$a$ intervening between the annular groove 48 and the groove 49, come into action successively in the course of traverse movement of the roller during the turn-up operation. Thus from position II of the movement (see Figure 12) to position III groove 48 is in contact with the plies wrapped about the bead core 46. From position III to position IV rib $r$ is in contact with the plies, groove 48 progressively moving away therefrom. During the first part of the movement from position IV to position V both the rib $r$ and the edge 43 are in contact with the plies and during a later part of this same movement edge 43 only is in contact therewith, rib $r$ maintaining contact with the plies until a position of the roller is reached in which said rib $r$ is rolling on that portion of the plies which overlies the round of the shoulder of the drum, at which position the rib $r$ leaves the plies. The shape of the roller is such that in the course of the turn-up traverse movement from position II to position V the whole of the surface of the plies becomes stitched first by the groove 48 and then by one or other of the following parts, namely the rib $r$ and the edge 43.

As shown in Figure 13, the sequence of the movements of the roller during the "second turn-down operation" is identical to that during the "first turn-down operation," except that roller 10 is (or may not be) driven by its motor. As a matter of fact, as for the "first turn-down operation," the folding is carried out by the groove 49 of the roller. The distance A of Figure 10 which is freely run by the roller during the operation (as already stated, equal to the width of the space occupied by the bead core wrapped with the plies) allows groove 49 to encircle the outer part of the tyre bead with the first series of plies in wrapped positon upon it, during the "second turn-down operation."

In Figure 13 the positions assumed by the roller during the "second turn-down operation" are progressively numbered I, II, III, IV, V. When the operation is effected, releasing pressure from cylinder 27 causes the roller to move away from the plies and through rotation of worm wheel 18 it is brought back to the initial position (position I, Figure 9). At this moment the roller is ready again to begin a fresh series of "first turn-down," "turn-up" and "second turn-down" operations on another series of ply assemblies to form another carcass.

As will be seen from Figures 12 and 13, the angle of "curvilinear traverse movement of the stiching roller around the shoulder of the drum end and around the bead core is an angle of approximately 180°. Actually it is a little more "in Figure 12 and a little less in Figure 13.

The stitching rollers can be of any suitable or necessary shape, by which is meant as regards the manner in which the diameter of the roller varies at successive points along the axis of the roller. Similarly the shape of the shoulders at the ends of the drum may be any suitable or necessary shape according to the required shape and size of the tyre.

The invention is applicable to the manufacture of tyres of any conventional size, including the size customarily used on passenger vehicle wheels and the larger sizes as generally used on truck and other heavy vehicle wheels. It is also applicable to the production of tyres in which the cord fabrics are provided with metallic filaments. It may be necessary, in order to adapt the machine to the production of large sized tyres or to the production of tyres having metallic armatures, to modify the precise arrangement and manner of operation of the various parts of the machine as described and illustrated in the drawings, while retaining, however, the general principle of operation of the machine.

What we claim as our invention and desire to secure by letters patent of the United States is:

1. In a tire forming apparatus, a supporting element, a shaft rotatably supported by said element for angular adjustment about the shaft axis, a trunnion cradle carried by said shaft, a roller supporting arm trunnioned in said cradle for angular movement about an axis transverse to that of the shaft, a stitching roller rotatably carried at the free end of said arm, said arm being movable relative to the shaft along the axis of said trunnion.

2. The combination of claim 1 including a driving motor interconnected between said arm and said roller and movable with both, for rotating the roller.

3. The combination of claim 2 in which said motor is partially housed within said roller and comprises a rotor connected to said roller and a stator connected to said arm.

4. The combination of claim 1 including a cylinder on one side of said trunnion cradle, coaxial with said trunnion axis, a piston reciprocable in said cylinder and having a piston rod coincident with said trunnion axis, said arm being fixed on and axially movable with said piston rod, said piston and piston rod being rotatable with said arm about said trunnion axis.

5. The combination of claim 4 including means projecting from said roller supporting arm eccentrically to said trunnion axis, a stem slidably disposed through said shaft coaxially therewith, and having means for thrusting engagement with said projecting means to move said arm about said axis.

6. Tire forming apparatus comprising a generally cylindrical tire building drum, means mounting said drum for rotation and for rotating said drum at a predetermined constant speed about its cylindrical axis, a stitching roller, an arm supporting said roller for axial movement along and in peripheral engagement with the tire forming material on said drum, a motor separate from said drum rotating means and said drum, said motor being partially housed within said roller and comprising a rotor operatively connected to said roller and a stator connected to said arm, said motor tending to rotate the roller at a peripheral speed greater than that of the drum, whereby engagement between the roller and the tire forming material on said drum will tend to circumferentially compress said material in the direction of rotation of the drum to avoid the formation of wrinkles in the material.

References Cited in the file of this patent
UNITED STATES PATENTS

| | | |
|---|---|---|
| 2,529,739 | Powers | Nov. 14, 1950 |
| 2,541,648 | Haase | Feb. 13, 1951 |
| 2,717,022 | Duerksen | Sept. 6, 1955 |